L. W. BUGBEE.
BIFOCAL LENS.
APPLICATION FILED MAY 28, 1921.
1,427,577.
Patented Aug. 29, 1922.
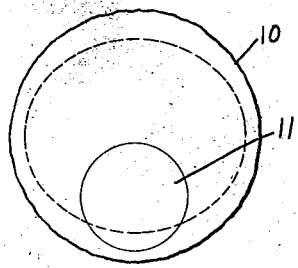
INVENTOR.
LUCIAN W. BUGBEE.
BY
ATTORNEYS.

UNITED STATES PATENT OFFICE.

LUCIAN W. BUGBEE, OF INDIANAPOLIS, INDIANA.

BIFOCAL LENS.

1,427,577.                    Specification of Letters Patent.    Patented Aug. 29, 1922.

Application filed May 28, 1921. Serial No. 473,348.

*To all whom it may concern:*

Be it known that I, LUCIAN W. BUGBEE, a citizen of the United States, and a resident of Indianapolis, county of Marion, and State of Indiana, have invented a certain new and useful Bifocal Lens; and I do hereby declare that the following is a full, clear, and exact description thereof, reference being had to the accompanying drawings, in which like numerals refer to like parts.

This invention relates to an improved bifocal lens of the Kryptok type, wherein the minor portion or insert is secured to the major portion of the lens by a glass or like cementing material which has a lower melting point than either the crown or the flint glass. By "glass cement," or "cementing glass" or "like cementing material," referred to herein is meant a cementing material formed of glass or other vitreous material.

Lenses of this type heretofore have consisted of a major portion for distance made of crown glass or glass having a relatively low index of refraction, and having a recess in one side thereof, leaving a concave spherically disposed surface in which an insert of flint glass or glass having a high index of refraction has been secured to constitute the reading portion of the lens. The two kinds of glass have been secured together heretofore by fusing them together or by cementing the same together with Canadian balsam or like cement.

In the drawings, Figure 1 is a plan view of a Kryptok lens blank in accordance with this invention, the contour of the finished lens being indicated by a dotted line. Fig. 2 is a central vertical section of Fig. 1, but on an enlarged scale.

Fig. 3 is a section of a portion of Fig. 2 on an enlarged scale.

In the drawings there is shown the main or distance portion 10 of a lens blank, which portion is usually made of crown glass, and a reading portion 11 which is usually made of flint glass, said reading portion 11 being cemented to the major or distance portion 10 by an intermediate layer of glass cement or the like 12.

In carrying out my present invention, the same process is employed as heretofore excepting that a glass cement is employed for securing the flint or reading glass insert to the crown glass or major portion of the lens, and when the lens is completed, said cement glass is in the form of a thin layer between the flint and crown glass portions.

The cementing glass, if used simply as a bond to secure the flint and crown glass together when they have substantially similar curvatures, one convex and the other concave, will be very thin with theoretically parallel surfaces and without any refractive power to affect the power of that portion of the lens.

By making the concave depression in the major lens of a stronger curvature than the convex surface of the flint added portion as shown in Fig. 3, and using cementing glass as above explained for securing them together, which is of a higher index of refraction than either the flint or crown glass, the layer of cementing glass will have the effect of a positive meniscus lens.

The cementing glass may be colorless or it may be colored in such a way as to absorb a predetermined portion of the visible spectrum. Thus the cementing glass may be of such nature as to absorb light from one end of the visible spectrum while the added or flint portion of the glass may be of such a nature as to absorb light from the opposite end of the spectrum. All three of the kinds of glass employed, namely, the crown glass, the flint glass and the cementing glass, have different properties as regards light absorption and each selectively absorbs a predetermined part of the spectrum, as desired.

Another advantage of this invention is that such a lens may be made with both the major portion and the minor or reading portion of glass of a low index of refraction, like crown glass, preferably hard crown glass capable of resisting scratches, and the cementing glass be such as to furnish the necessary higher index of refraction for the reading portion of the lens.

In making this invention, the cementing glass referred to of a lower melting point than either the crown or ordinary flint glass, may be lead borate. But if both the major and minor segments be crown glass, then any flint glass may be used as a cementing glass for all flint glass has a lower melting point than crown glass.

I am aware that it has been common practice to make Kryptok lenses or the like by using balsam, as heretofore stated, and that balsam has a lower melting point than the pieces of glass cemented together by it; but I am not aware of any lens of this type having been made wherein the cementing material was made of glass or other vitreous material, whereby the two pieces of glass are permanently secured together or have the other characteristics above referred to. The balsam is not a permanent cement and it does not lend to the lens the characteristics herein referred to. The cement formed of glass or other vitreous material is hard and in its various characteristics closely approaches the crown and flint glass which is secured together by the cement, and the pieces of glass and the glass cement are in effect welded together, so as to make a more perfect and more nearly homogeneous lens and one as nearly integral as any lens could be formed of more than one piece of glass or when the two portions of the lens are fused together, and yet have the other characteristics and advantages herein set forth. The glass or vitreous cement has a lower melting point than the major and minor portions of the lens so that when the crown and flint glass portions are being cemented together, neither of them will be melted or otherwise altered or affected, as is the case when they are fused together. The fusion in this invention is limited to the glass cement and hence the crown and flint glass portions are not injured or destroyed during the uniting process, as is so frequently the case when they are being fused together.

The invention claimed is:

1. A bifocal lens formed of two pieces of glass, and a glass cement securing said pieces of glass to each other which has a lower melting point than said pieces of glass.

2. A bifocal lens consisting of a major portion of glass with a recess in one side thereof, a minor portion of glass fitting in said recess, and a cementing glass in said recess having a lower melting point than either of said portions of glass for securing them together.

3. A bifocal lens consisting of a major portion of glass of a relatively low index of refraction having a recess in one side thereof, a minor portion of glass of a relatively high index of refraction in said recess, and cementing glass in said recess having a lower melting point than either of said portions of glass for securing them together.

4. A bifocal lens consisting of a major portion of crown glass having a recess in one side thereof, a minor portion of flint glass fitting in said recess, and cementing glass in said recess having a lower melting point than either of said portions of glass for securing them together.

5. A bifocal lens having a major portion with a spherically disposed concave surface in one side thereof, a minor portion having a spherically-disposed convex surface of weaker curvature than the curvature of said recessed surface in the major portion of the lens, and cementing glass in said recess for securing the two portions of glass to each other.

6. A bifocal lens consisting of a major portion formed of glass capable of absorbing one part of the visible spectrum with a recess in one side thereof, a minor portion in said recess formed of glass capable of absorbing another portion of the visible spectrum, and a cementing glass in said recess for securing said two portions of glass together, said cementing glass capable of absorbing still another portion of the visible spectrum.

In witness whereof, I have hereunto affixed my signature.

LUCIAN W. BUGBEE.